United States Patent
Haupt et al.

(10) Patent No.: US 12,043,093 B2
(45) Date of Patent: Jul. 23, 2024

(54) HYBRID DOOR SEAL FOR A VEHICLE

(71) Applicant: Nissan North America, Inc., Franklin, TN (US)

(72) Inventors: James Haupt, Livonia, MI (US); Marlo Martino, Rochester Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 442 days.

(21) Appl. No.: 17/387,816

(22) Filed: Jul. 28, 2021

(65) Prior Publication Data

US 2023/0036053 A1 Feb. 2, 2023

(51) Int. Cl.
*B60J 10/21* (2016.01)
*B60J 10/00* (2016.01)
*B60J 10/78* (2016.01)

(52) U.S. Cl.
CPC .............. *B60J 10/45* (2016.02); *B60J 10/21* (2016.02); *B60J 10/78* (2016.02)

(58) Field of Classification Search
CPC ... B60J 10/45; B60J 10/21; B60J 10/74; B60J 10/76; B60J 10/78
See application file for complete search history.

(56) References Cited

U.S. PATENT DOCUMENTS

| | | | |
|---|---|---|---|
| 7,364,382 B2 | 4/2008 | Benedetti et al. | |
| 8,528,295 B2 | 9/2013 | Glynn et al. | |
| 9,649,921 B2 | 5/2017 | Bessho et al. | |
| 9,657,807 B2 | 5/2017 | Morris et al. | |
| 10,968,931 B1 | 4/2021 | Forti et al. | |
| 2002/0058124 A1* | 5/2002 | Nakajima | B29C 48/12 428/156 |
| 2002/0139054 A1* | 10/2002 | Schlachter | B60J 10/88 49/479.1 |
| 2004/0212127 A1* | 10/2004 | Saji | B60J 10/74 264/255 |
| 2005/0008819 A1* | 1/2005 | Kubo | B29C 45/14409 428/122 |
| 2006/0026903 A1* | 2/2006 | Nozaki | B60J 10/74 49/441 |
| 2006/0064936 A1* | 3/2006 | Shiraiwa | B60J 10/16 49/441 |
| 2006/0265995 A1* | 11/2006 | Yamada | B60J 10/74 52/716.5 |

(Continued)

FOREIGN PATENT DOCUMENTS

EP 0885778 A2 12/1998
EP 1475273 A1 11/2004

(Continued)

*Primary Examiner* — Gregory A Blankenship
(74) *Attorney, Agent, or Firm* — Global IP Counselors, LLP

(57) ABSTRACT

A hybrid door seal for a vehicle includes a first seal member, a second seal member, and a corner seal member. The first seal member is configured to be received by a channel in a door frame. The second seal member is configured to be received by the channel in a door frame. The corner seal member connects the first seal member and the second seal member. The first seal member, the second seal member and the corner seal member are integrally formed as a one-piece member.

14 Claims, 8 Drawing Sheets

(56) References Cited

U.S. PATENT DOCUMENTS

| | | | | |
|---|---|---|---|---|
| 2007/0006534 | A1* | 1/2007 | Hiramatsu | B60J 10/30 49/428 |
| 2007/0175101 | A1* | 8/2007 | Kanehara | B60J 10/50 49/441 |
| 2014/0062122 | A1* | 3/2014 | Katayama | B60J 5/0402 296/146.2 |
| 2015/0082709 | A1* | 3/2015 | Dosaki | B60J 10/76 49/490.1 |
| 2015/0101254 | A1* | 4/2015 | Tooker | B60J 1/007 49/476.1 |
| 2016/0214471 | A1* | 7/2016 | Bessho | B60J 5/0419 |
| 2018/0339582 | A1* | 11/2018 | Taketomo | B60J 10/21 |
| 2019/0031004 | A1* | 1/2019 | Kanphade | B60J 10/21 |
| 2020/0122558 | A1* | 4/2020 | Seong | B60J 10/76 |
| 2021/0031599 | A1* | 2/2021 | Nojiri | B60J 5/0402 |
| 2021/0178867 | A1* | 6/2021 | Fukatami | B60J 5/0402 |
| 2021/0331568 | A1* | 10/2021 | Nishikawa | B60J 10/21 |
| 2022/0001733 | A1* | 1/2022 | Kojima | B60J 10/76 |
| 2022/0097507 | A1* | 3/2022 | Kuroki | B60J 10/21 |
| 2022/0219519 | A1* | 7/2022 | Groters | B60J 10/27 |
| 2022/0227212 | A1* | 7/2022 | Haruta | B60J 10/76 |
| 2023/0036053 | A1* | 2/2023 | Haupt | B60J 10/76 |
| 2023/0065367 | A1* | 3/2023 | Nojiri | B60J 10/50 |
| 2023/0106306 | A1* | 4/2023 | Nojiri | B60J 10/50 49/479.1 |

FOREIGN PATENT DOCUMENTS

| | | |
|---|---|---|
| EP | 1292486 B1 | 6/2005 |
| JP | 4434893 B2 | 3/2010 |
| WO | 01/98133 A2 | 12/2001 |
| WO | 2018/060964 A1 | 4/2018 |

* cited by examiner

HYBRID DOOR SEAL FOR A VEHICLE

BACKGROUND

Technical Field

The present disclosure generally relates to a hybrid door seal for a vehicle. More specifically, the present invention relates to a corner seal member of a hybrid door seal for a vehicle.

Background Information

A door glass run is connected to a door frame of a vehicle. The door glass run provides a groove in which a door window is movably received. The door glass run provides a seal for the door window. Gapping can occur between the door glass run and an interior trim member connected to the door frame.

SUMMARY

One object of the present invention is to provide a hybrid door seal for a vehicle that substantially eliminates gapping in a corner of a glass door run.

In view of the state of the known technology, one aspect of the present invention is to provide a hybrid door seal for a vehicle includes a first seal member, a second seal member, and a corner seal member. The first seal member is configured to be received by a channel in a door frame. The second seal member is configured to be received by the channel in a door frame. The corner seal member connects the first seal member and the second seal member. The first seal member, the second seal member and the corner seal member are integrally formed as a one-piece member.

Another aspect of the present invention is to provide a door assembly for a vehicle including a door frame and a hybrid door seal. The door frame includes a first channel and a second channel. The first and second channels extend in different directions. The hybrid door seal includes a first seal member, a second seal member, and a corner seal member. The hybrid door seal is disposed in the first and second channels. The first seal member is disposed in the first channel of the door frame. The second seal member is disposed in the second channel of the door frame. The corner seal member connects the first seal member and the second seal member. The first seal member, the second seal member and the corner seal member are integrally formed as a one-piece member.

Also other objects, features, aspects and advantages of the disclosed hybrid door seal for a vehicle will become apparent to those skilled in the art from the following detailed description, which, taken in conjunction with the annexed drawings, discloses exemplary embodiments of the hybrid door seal for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
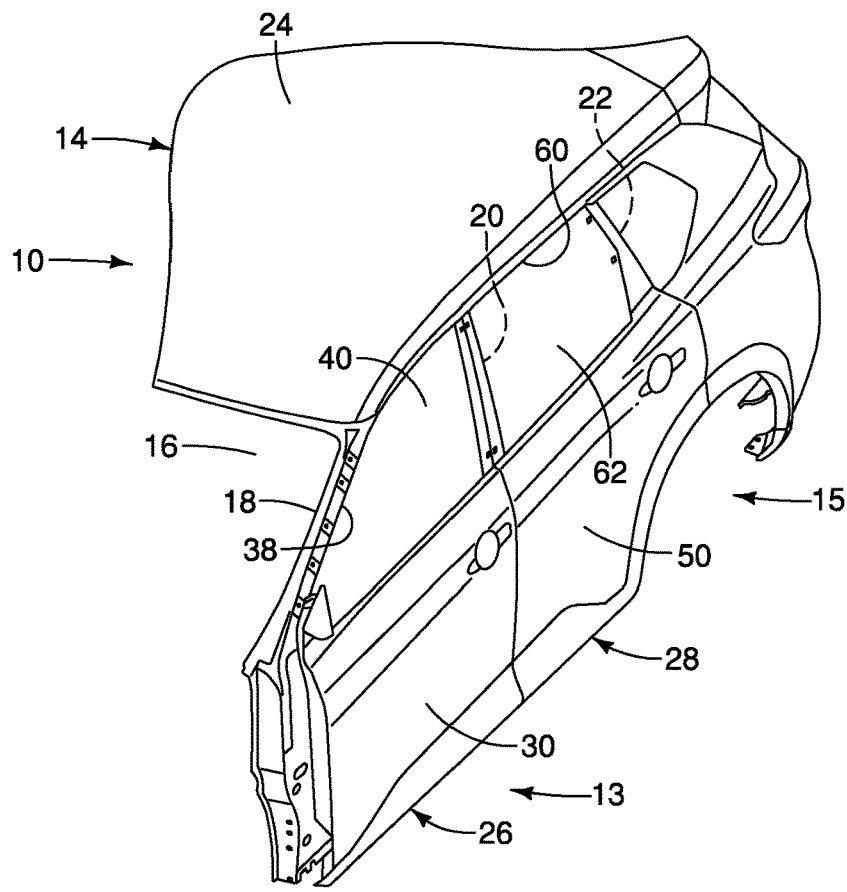
FIG. 1 is a perspective view of a vehicle equipped with a hybrid door seal in accordance with an exemplary embodiment of the present invention.
Figure 2:
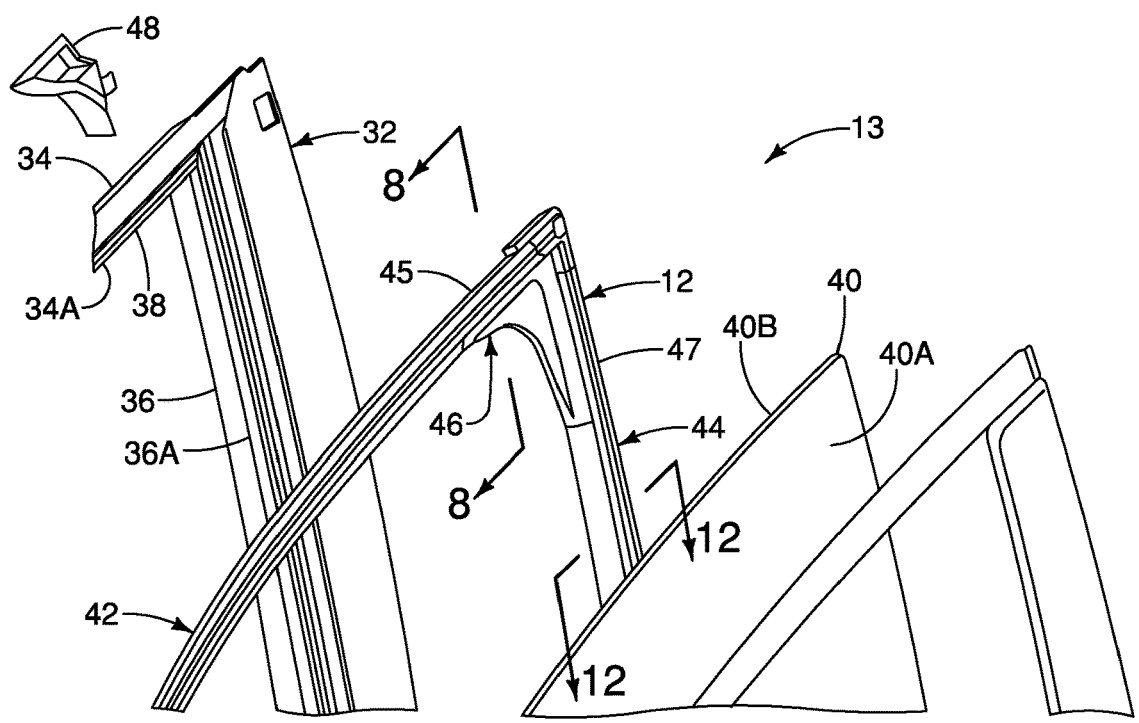
FIG. 2 is an exploded inboard perspective view of a front door of the vehicle of FIG. 1.
Figure 3:
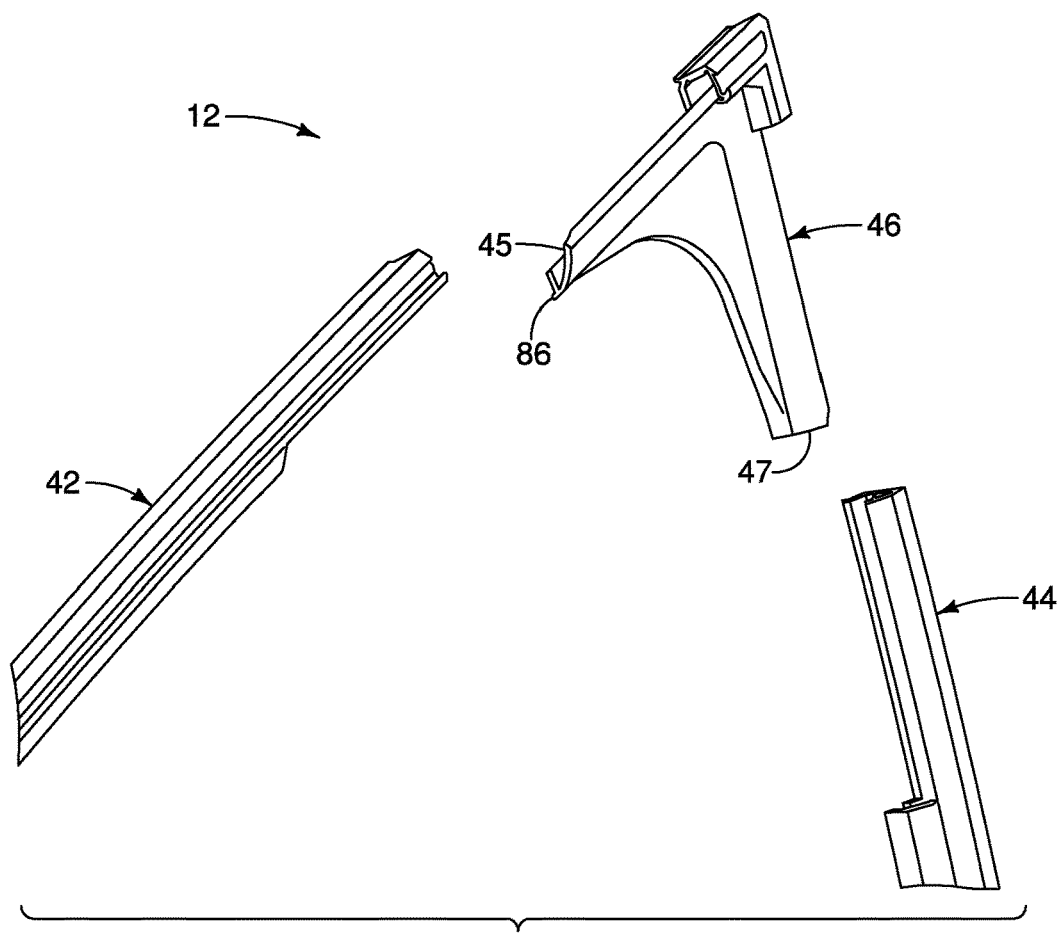
FIG. 3 is an exploded inboard perspective view of the hybrid door seal of the front door of FIG. 2.
Figure 4:
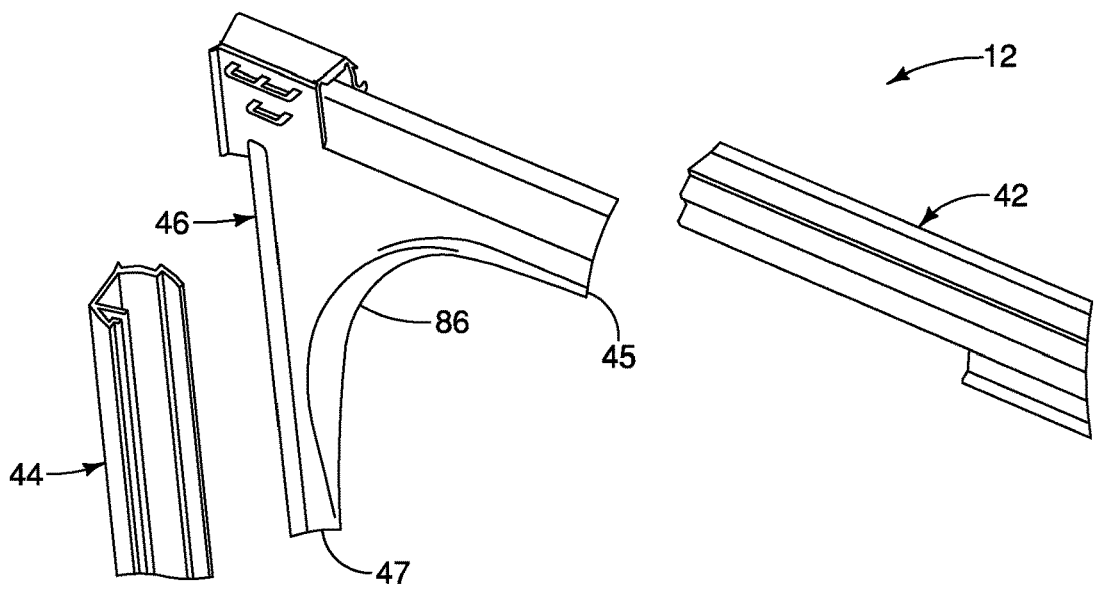
FIG. 4 is an exploded outboard rearward perspective view of the hybrid door seal of FIG. 3.
Figure 5:
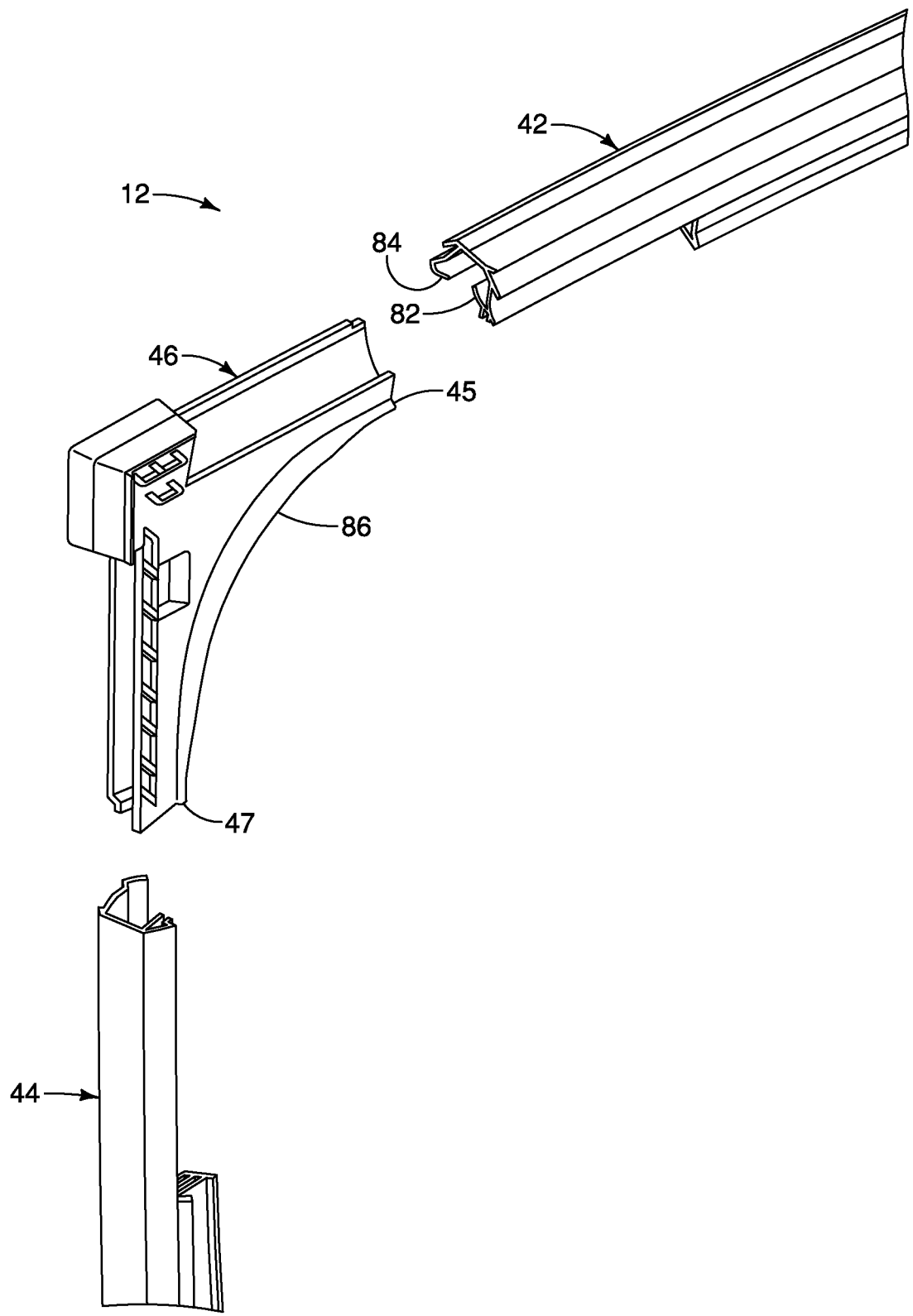
FIG. 5 is an exploded outboard forward perspective view of the hybrid door seal of FIG. 4.

Referring initially to FIGS. 1 and 2, a vehicle 10 including a hybrid door seal 12 is illustrated in accordance with an exemplary embodiment of the present invention. The vehicle 10 includes a body structure 14 that defines a passenger compartment 16. The vehicle body structure 14 includes an A-pillar structure 18, a B-pillar structure 20, a C-pillar structure 22, and a roof structure 24. Vehicle body structures are conventional structures well-known in the art, such that further description of the vehicle body structure 14 is omitted, except where necessary, for the sake of brevity.

A first, or front, door 26 is movably connected to the body structure 14 for movement between a closed position shown in FIG. 1 and an open position to access the passenger compartment 16. A second, or rear, door 28 is movably connected to the body structure 14 for movement between a closed position shown in FIG. 1 and an open position to access the passenger compartment 16. Front and rear doors disposed on a passenger side of the vehicle 10 are similarly configured to the front and rear doors 26 and 28 on a driver side of the vehicle 10, and not discussed herein for the sake of brevity.

Figure 8:
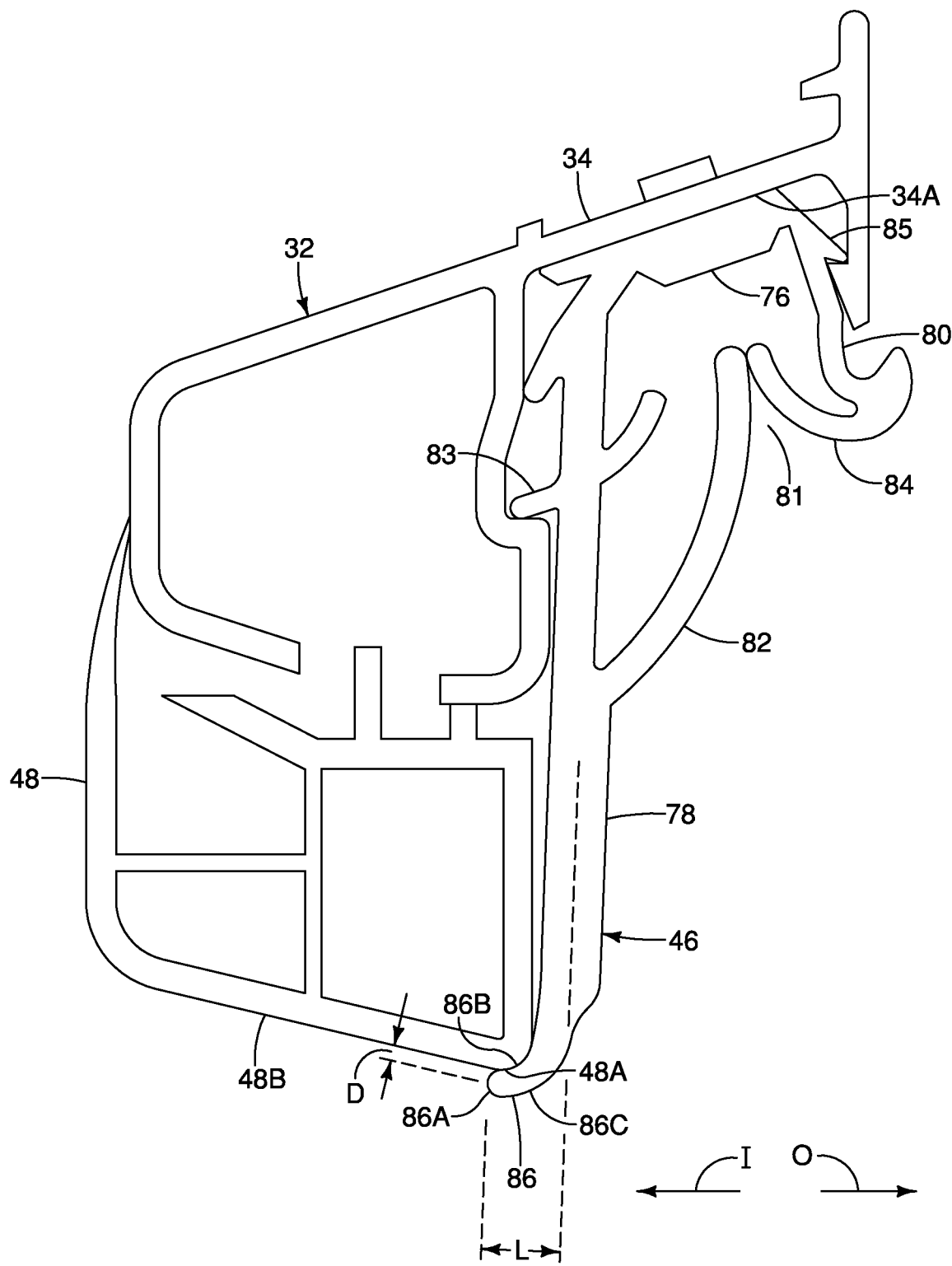
FIG. 8 is a side elevational view in cross section taken along line 8-8 of FIG. 2 of the hybrid door seal disposed in the first door frame.

The first door 26 includes a first door panel 30 and a first door frame 32 connected to the first door panel 30, as shown in FIGS. 1 and 2. The first door frame 32 includes a first extending portion 34 extending in the first direction, and a second extending portion 36 extending in a second direction. The first extending portion 34 includes a first channel 34A extending in the first direction, as shown in FIGS. 2 and 8. The second extending portion 36 includes a second channel 36A extending in the second direction. The first direction is different from the second direction. As shown in FIG. 2, the first direction is a substantially horizontal, or longitudinal, direction, and the second direction is a substantially vertical, or height, direction.

A first window opening 38 is defined by the first extending portion 34 and the second extending portion 36 of the first door frame 32, as shown in FIGS. 1 and 2. A window, or door glass, 40 is movably disposed in the first window opening 38.

Figure 11:
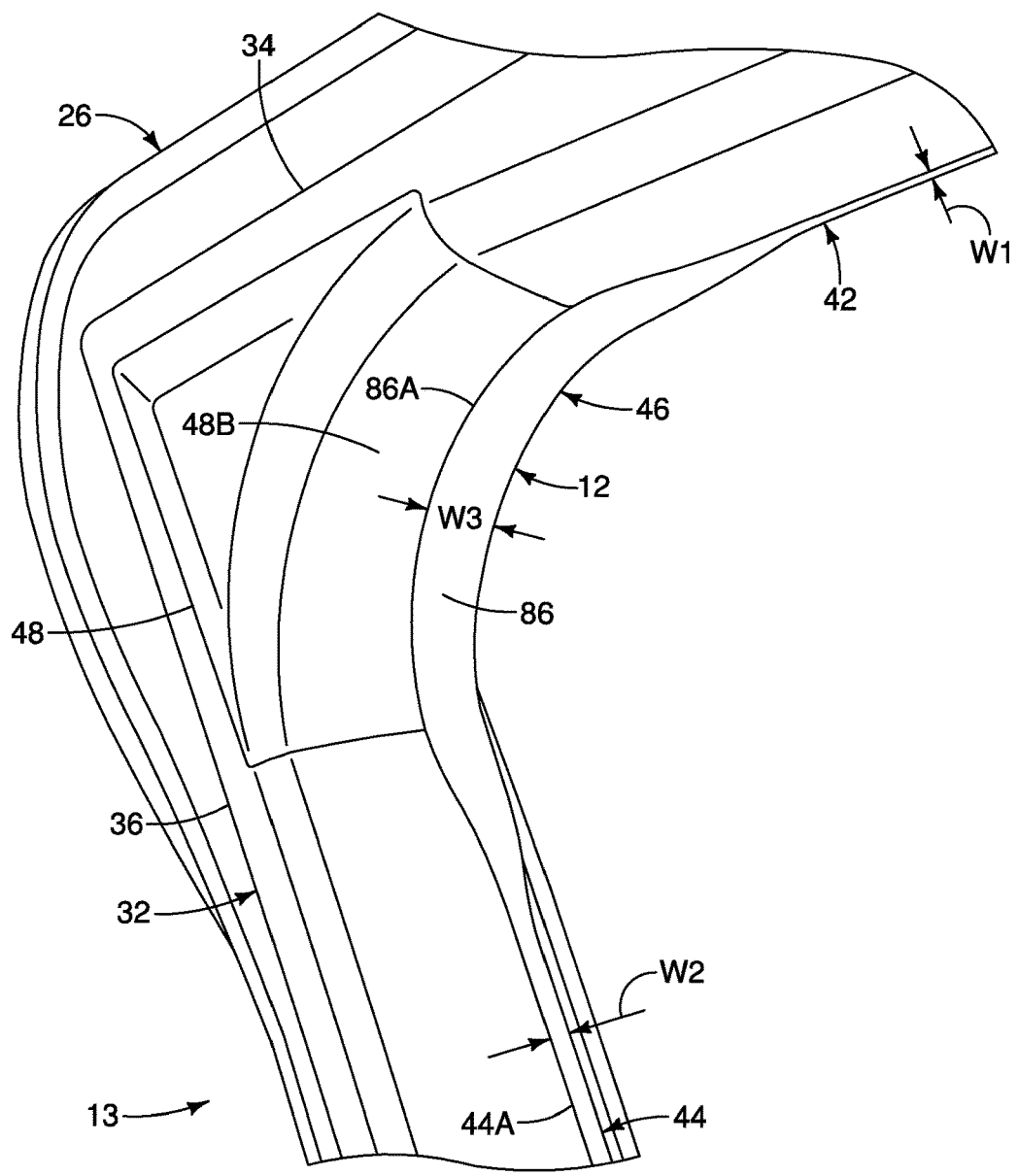
FIG. 11 is an outboard perspective view of the hybrid door seal connected to the front door of FIG. 2.

The hybrid door seal, or door glass run, 12 is disposed in the first and second channels 34A and 34B of the first and second extending portions 34 and 36 of the first door frame 32, as shown in FIGS. 1, 2, 8 and 11. The hybrid door seal 12 provides a seal between the first door frame 32 and the window 40. A first door assembly 13, as shown in FIGS. 2 and 11, includes the first door frame 32 and the hybrid door seal 12. The first door assembly 13 can further include an interior trim member 48 connected to an inboard side of the first door frame 32, as shown in FIGS. 2, 8 and 11, in the vicinity of the corner at the B-pillar structure 20.

As shown in FIGS. 2-5 and 11, the hybrid door seal 12 includes a first seal member 42, a second seal member 44, and a corner seal member 46. The first seal member 42 is configured to be received by the first channel 34A of the first extending portion 34 of the first door frame 32. The second seal member 44 is configured to be received by the second channel 36A of the second extending portion 36 of the first door frame 32. The corner seal member 46 is configured to be received by the first channel 34A of the first extending portion 34 of the first door frame 32 and by the second channel 36A of the second extending portion 36. The first seal member 42, the second seal member 44 and the corner seal member 46 of the hybrid door seal 12 are configured to receive the first window 40.

The first and second seal members 42 and 44 are preferably formed by extrusion. The ends of the first and second seal members 42 and 44 are placed in a mold, and the corner seal member 46 is preferably formed by injection molding to connect the first and second seal members 42 and 44. The hybrid door seal 12 is integrally formed as a one-piece member. The hybrid door seal 12 is made of any suitable material, such a rubber material. The hybrid door seal 12 is preferably made of a polypropylene and an ethylene-propylene-diene monomer blend. The first seal member 42, the second seal member 44, and the corner seal member 46 are preferably made of the same material.

An interior trim member 48 is connected to the first door frame 32, as shown in FIGS. 2, 8 and 11. The interior trim member 48 is configured to cover an inboard side of the first door frame 32 and the hybrid door seal 12. The interior trim member 48 is connected to the door frame 32 in any suitable manner.

Figure 6:
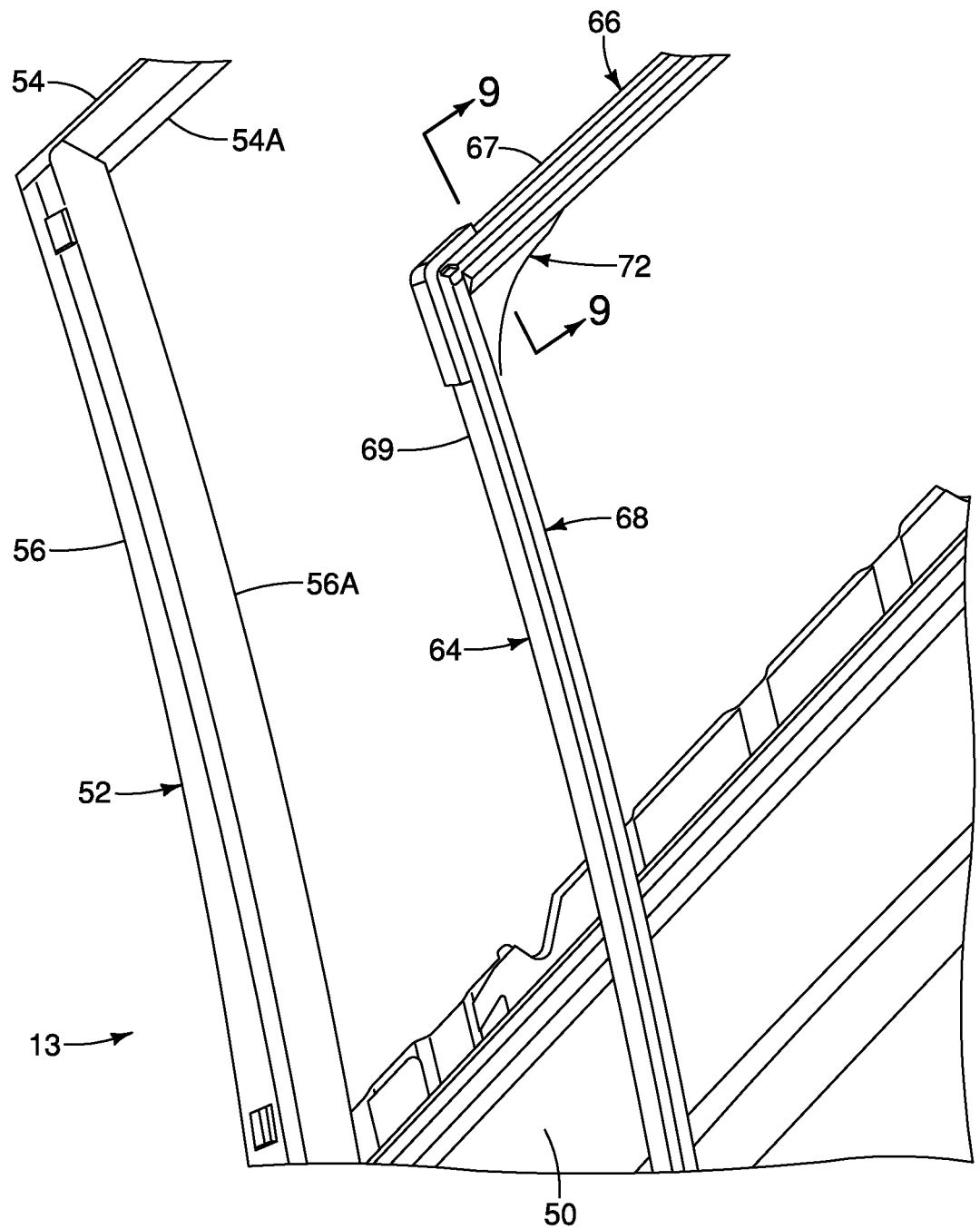
FIG. 6 is an exploded inboard perspective view of a rear door of the vehicle of FIG. 1 in the vicinity of a B pillar structure.
Figure 7:
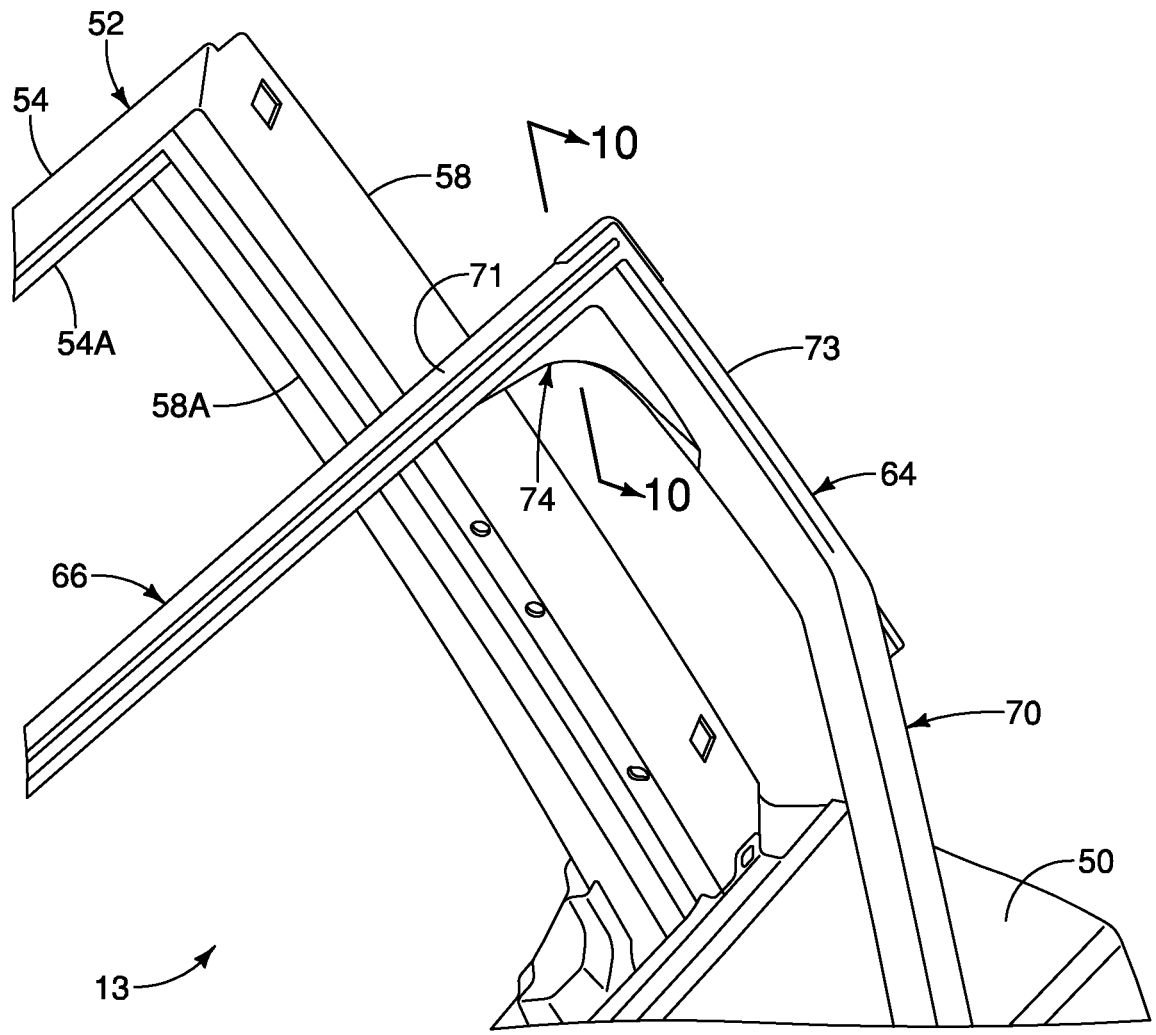
FIG. 7 is an exploded inboard perspective view of the rear door of the vehicle of FIG. 1 in the vicinity of a C pillar structure.

The second door 28 includes a second door panel 50 and a second door frame 52 connected to the second door panel 50, as shown in FIGS. 1, 6 and 7. The second door frame 32 includes a second extending portion 54 extending in the first direction, a second extending portion 56 extending in a second direction, and a third extending portion 58 extending in the second direction. The first extending portion 54 includes a first channel 54A extending in the first direction. The second extending portion 56 includes a second channel 56A extending in the second direction. The third extending portion 58 includes a third channel 58A extending in the second direction. The first direction is different from the second direction. As shown in FIGS. 6 and 7, the first direction is a substantially horizontal, or longitudinal, direction, and the second direction is a substantially vertical, or height, direction.

A second window opening 60 is defined by the first extending portion 54, the second extending portion 56 and the third extending portion 58 of the second door frame 52, as shown in FIGS. 1, 6 and 7. A second window, or door glass, 62 is movably disposed in the second window opening 60.

A second hybrid door seal, or door glass run, 64 is disposed in the first, second and third channels 54A, 56A and 58A of the first, second and third extending portions 54, 56 and 58 of the second door frame 52, as shown in FIGS. 1, 6, 7, 9 and 10. The second hybrid door seal 64 provides a seal between the second door frame 52 and the second window 62. The second hybrid door seal 64 is substantially similar to the hybrid door seal 12, except that the hybrid door seal 64 includes first and second corner seal members 72 and 74 as described below.

As shown in FIGS. 6 and 7, the second hybrid door seal 64 includes a first seal member 66, a second seal member 68, a third seal member 70, and first and second corner seal members 72 and 74. The first seal member 66 is configured to be received by the first channel 56A of the first extending portion 56 of the second door frame 52. The second seal member 68 is configured to be received by the second channel 56A of the second extending portion 56 of the second door frame 52. The third seal member 70 is configured to be received by the third channel 58A of the third extending portion 58 of the second door frame 52. The first corner seal member 72 is configured to be received by the first channel 54A of the first extending portion 54 of the second door frame 52 and by the second channel 56A of the second extending portion 56. The second corner seal member 74 is configured to be received by the first channel 54A of the first extending portion 54 of the second door frame 52 and by the third channel 58A of the third extending portion 58. The first seal member 66, the second seal member 68, the first corner seal member 72 and the second corner seal member 74 of the second hybrid door seal 64 are configured to receive the second window 62.

The first, second and third seal members 66, 68 and 70 are preferably formed by extrusion. The ends of the first, second and third seal members 66, 68 and 70 are placed in molds. The first corner seal member 72 is preferably formed by injection molding to connect the first and second seal members 66 and 68. The second corner seal member 74 is preferably formed by injection molding to connect the first and third seal members 66 and 70. The second hybrid door seal 64 is integrally formed as a one-piece member. The second hybrid door seal 64 is made of any suitable material, such a rubber material. The second hybrid door seal 64 is preferably made of a polypropylene and an ethylene-propylene-diene monomer blend. The configuration of the second hybrid door seal 64 is substantially similar to the hybrid door seal 12, except that the second hybrid door seal 64 has first and second corner seal members 72 and 74 disposed in the corners of the second door frame 52.

The corner seal member 46, as shown in FIG. 8, is disposed in the first channel 34A of the first extending portion 34 of the first frame 32. The corner seal member 46 includes a base 76 that contacts the first channel 34A. An inboard wall 78 extends from the base 76. An outboard wall 80 extends from the base 76. The inboard wall 78 and the outboard wall 80 define a receiving area 81 therebetween configured to receive the first window 40 (FIG. 1). A first lip 82 extends in an outboard direction θ from the inboard wall 78. A second lip 84 extends in an inboard direction I from the outboard wall 84. The first lip 82 and the second lip 84 seal the first window 40 when it is received by the corner seal member 46. The first lip 82 contacts the second lip 84 when the window 40 is not received therebetween, as shown in FIG. 8. The first lip 82 is configured to engage an inboard side 40B (FIG. 1) of the window 40, and the second lip 84 is configured to engage an outboard side 40A of the window 40 when the window 40 is received by the corner seal member 46, as shown in FIG. 1.

A first attachment member 83 extends in an inboard direction from the inboard wall 78 of the corner seal member 46. A second attachment member 85 extends in an outboard direction from the outboard wall 80. The first and second attachment members 83 and 85 engage side walls of the first channel 34A to securely retain the corner seal member to the first frame 32.

A third lip 86 extends in the inboard direction I from a lower end of the inboard wall 78, as shown in FIG. 8. The third lip 86 is curved. The third lip 86 engages a lowermost portion 48A of the interior trim member 48. A free end 86A of the third lip 86 is spaced from the lower surface 48B of the interior trim member 48. The free end 86A is an inboard-most portion of the corner seal member 46. As shown in FIG. 8, the free end 86A of the third lip 86 of the corner seal member 46 is spaced by a distance D from the lower surface 48B of the interior trim member 48 connected to the first frame 32.

Figure 9:
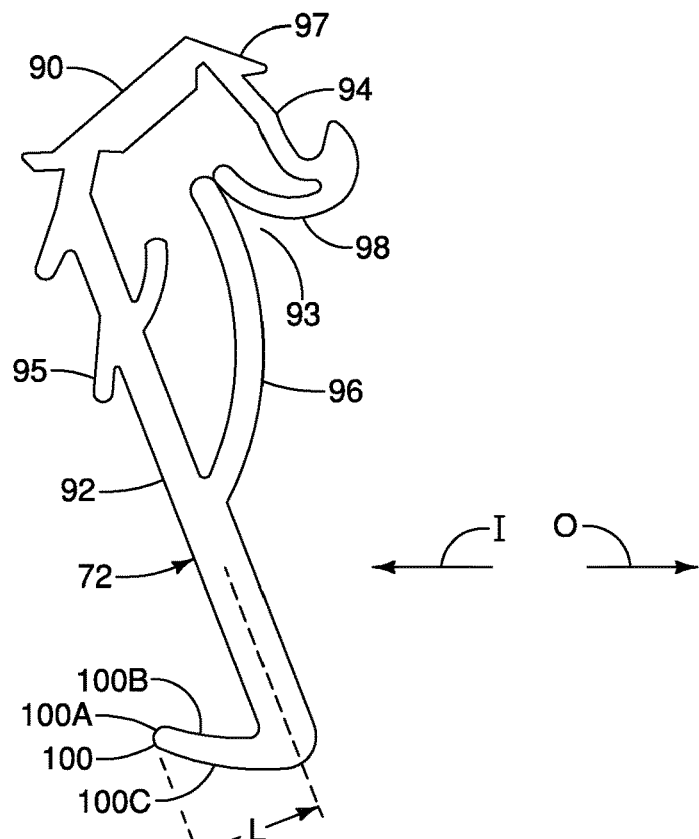
FIG. 9 is a side elevational view in cross section taken along line 9-9 of FIG. 6 of the first corner seal member of a second hybrid door seal.
Figure 10:
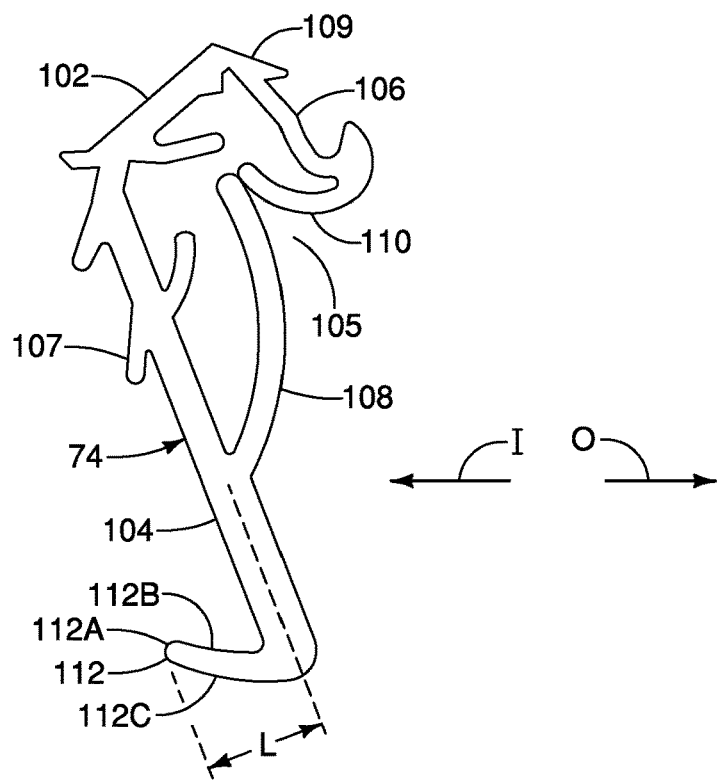
FIG. 10 is a side elevational view in cross section taken along line 10-10 of FIG. 7 of the second corner seal member of the second hybrid door seal.

As shown in FIG. 8, an upper surface 86B and a lower surface 86C of the third lip 86 are both curved. As shown in FIG. 2, the cross section illustrated in FIG. 8 is taken proximate a transition point 45 from the first seal member 42 to the corner seal member 46. The third lip 86 transitions from curving downwardly, as shown in FIG. 8 proximate the transition point 45 to curving upwardly spaced from the transition point 45, as shown in FIGS. 9 and 10. The corner seal member 46 is similarly configured at the transition point 47 from the second seal member 44 to the corner seal member 46. The third lip 86 of the corner seal member 46 transitions from the upper and lower surfaces 86B and 86C curving downwardly (FIG. 8) at the transition points 45 and 47 to the first and second seal members 42 and 44 to the upper and lower surfaces 86B and 86C curving upwardly (FIGS. 9 and 10) as the distance from the transition to the first and second seal members 42 and 44 increases. This configuration of the third lip 86 of the corner seal member 46 substantially prevents visible gapping with the interior trim member 48 connected to the first door frame 32. The transition of the third lip 86 from curving downwardly to curving upwardly and back to curving downwardly moving away from the transition point 45 with the first seal member 42 to the transition point 47 with the second seal member 44 facilitates preventing visible gapping with the interior trim member 48.

As shown in FIG. 11, the corner seal member 46 is configured to substantially prevent visible gapping in the corner of the hybrid seal member 46. The third lip 86 of the corner seal member 46 has a first width W1 proximate the transition point between the corner seal member 46 and the first seal member 42. The third lip 86 of the corner seal member 46 has a second width W2 proximate the transition point between the corner seal member 46 and the second seal member 44. The third lip 86 of the corner seal member 46 has a third width W3 between the transition points. The third width W3 is larger than each of the first and second widths W1 and W2. In other words, the third lip 86 transitions from having a smaller width (proximate the first seal member 42), to having a larger width (proximate the corner of the first door frame 32) to having a smaller width (proximate the second seal member 44). The third lip 86 of the corner seal member 46 does not have a substantially constant width to facilitate substantially preventing visible gapping. The first width W1, the second width W2 and the third width W3 can be any suitable width. For example, the first width W1 can be approximately 4.3 mm, the second width W2 can be 4.2 mm, and the third width W3 can be approximately 10.9 mm.

Figure 12:
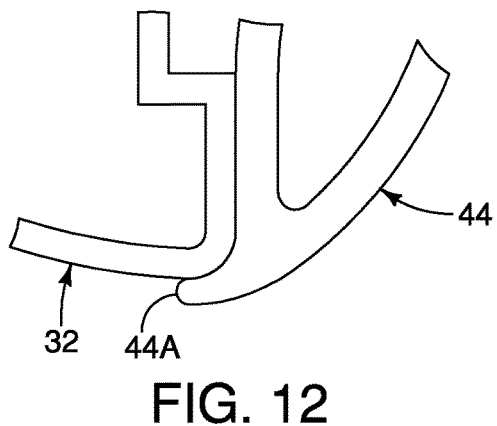
FIG. 12 is a side elevational view in cross section taken along line 12-12 of FIG. 2 of the hybrid door seal disposed in the first door frame.

As shown in FIG. 11, the width of the second seal member 44 is substantially equivalent to the width W2 of the corner seal member 46 proximate the second seal member 44. The width of the first seal member 42 is substantially equivalent to the width W1 of the corner seal member 46 proximate the first seal member 42. A lip 44A of the second seal member 46 overlies the first door frame 32, as shown in FIG. 12, substantially similar to the third lip 86 of the corner seal member 46 overlying the interior trim member 48 shown in FIG. 8. A lip of the first seal member 42 is similarly configured as the lip 44A of the second seal member 44. The transition between each of the first and second seal members 42 and 44 and the corner seal member 46 is facilitated by maintaining the widths W1 and W2, as shown in FIG. 11. The width of the corner seal member 46 increases into the corner and then decreases out of the corner of the first door frame 32 to substantially prevent visible gapping.

A second door assembly 15, as shown in FIGS. 2, 6 and 7, includes the second door frame 52 and the second hybrid door seal 64. The second door assembly 15 can further include an interior trim member (not shown) connected to an inboard side of the second door frame 52 in the vicinity of the corners at the B and C-pillar structures 20 and 22.

The second door assembly 15 is configured substantially similarly to the first door assembly 13, with the exception of the second hybrid door seal 64 having first and second corner seal members 72 and 74, as shown in FIGS. 1, 6 and 7.

A cross section of the first corner seal member 72 of the second hybrid door seal 64, as shown in FIG. 6, is illustrated in FIG. 9. The first corner seal member 72 is substantially similar to the corner seal member 46 shown in FIG. 8. The first corner seal member 72, as shown in FIG. 6, is disposed in the first channel 54A of the first extending portion 54 of the second frame 52. The first corner seal member 72 includes a base 90 that contacts the first channel 54A. An inboard wall 92 extends from the base 90. An outboard wall 94 extends from the base 90. The inboard wall 92 and the outboard wall 94 define a receiving area 93 therebetween configured to receive the second window 62 (FIG. 1). A first lip 96 extends in an outboard direction θ from the inboard wall 92. A second lip 98 extends in an inboard direction I from the outboard wall 94. The first lip 96 and the second lip 98 seal the second window 62 when it is received by the first corner seal member 72. The first lip 96 contacts the second lip 98 when the second window 62 is not received therebetween, as shown in FIG. 9. The first lip 96 is configured to engage an inboard side of the first window 62, and the second lip 98 is configured to engage an outboard side of the second window 62 when the second window 62 is received by the first corner seal member 72, as shown in FIG. 1.

A first attachment member 95 extends in an inboard direction from the inboard wall 92 of the first corner seal member 72. A second attachment member 97 extends in an outboard direction from the outboard wall 94. The first and second attachment members 95 and 97 engage side walls of the first channel 54A to securely retain the corner seal member to the second frame 52.

A third lip 100 extends in the inboard direction I from a lower end of the inboard wall 92, as shown in FIG. 9. The third lip 100 is curved. The third lip 100 engages a lowermost portion of the interior trim member. A free end 100A of the third lip 86 is spaced from the lower surface of the interior trim member, similarly to the free end 86A of the third lip 86 shown in FIG. 8. The free end 100A is an inboard-most portion of the first corner seal member 72.

As shown in FIG. 9, an upper surface 100B and a lower surface 100C of the third lip 100 are both curved. As shown in FIG. 6, the cross section illustrated in FIG. 9 is taken spaced from a transition point 67 from the first seal member 66 to the corner seal member 72. The third lip 100 transitions from curving downwardly (FIG. 8) proximate the transition point 67 to curving upwardly spaced from the transition point 67, as shown in FIG. 9. The first corner seal member 72 is similarly configured at the transition point 69 from the second seal member 68 to the first corner seal member 72. The third lip 100 of the first corner seal member 72 transitions from the upper and lower surfaces 100B and 100C curving downwardly (FIG. 8) at the transition points 67 and 69 to the first and second seal members 66 and 68 to the upper and lower surfaces 100B and 100C curving upwardly, as shown in FIG. 9, as the distance from the transition points 67 and 69 to the first and second seal members 66 and 68 increases. This configuration of the third lip 100 of the first corner seal member 100 substantially prevents visible gapping with the interior trim member connected to the door frame 52 in the vicinity of the B-pillar structure 20. The transition of the third lip 100 from curving downwardly to curving upwardly and back to curving downwardly moving away from the transition point 67 with the first seal member 66 to the transition point 69 with the second seal member 68 facilitates preventing visible gapping with the interior trim member.

A cross section of the second corner seal member 74 of the second hybrid door seal 64, as shown in FIG. 7, is illustrated in FIG. 10. The second corner seal member 74 is substantially similar to the corner seal member 46 shown in FIG. 8 and to the first corner seal member 72 shown in FIG. 9. The second corner seal member 72, as shown in FIG. 7, is disposed in the first channel 54A of the first extending portion 54 of the second frame 52. The second corner seal member 74 includes a base 102 that contacts the first channel 54A. An inboard wall 104 extends from the base 102. An outboard wall 106 extends from the base 102. The inboard wall 104 and the outboard wall 106 define a receiving area 105 therebetween configured to receive the second window 62 (FIG. 1). A first lip 108 extends in an outboard direction O from the inboard wall 104. A second lip 110 extends in an inboard direction I from the outboard wall 106. The first lip 108 and the second lip 110 seal the second window 62 when it is received by the second corner seal member 74. The first lip 108 contacts the second lip 110 when the second window 62 is not received therebetween, as shown in FIG. 10. The first lip 108 is configured to engage an inboard side of the second window 62, and the second lip 110 is configured to engage an outboard side of the second window 62 when the second window 62 is received by the second corner seal member 74, as shown in FIG. 1.

A first attachment member 107 extends in an inboard direction from the inboard wall 104 of the second corner seal member 74. A second attachment member 109 extends in an outboard direction from the outboard wall 106. The first and second attachment members 107 and 109 engage side walls of the first channel 54A to securely retain the second corner seal member 74 to the second frame 52.

A third lip 112 extends in the inboard direction I from a lower end of the inboard wall 104, as shown in FIG. 10. The third lip 112 is curved. The third lip 112 engages a lower-most portion of the interior trim member. A free end 112A of the third lip 112 is spaced from the lower surface of the interior trim member, similarly to the free end 86A of the third lip 86 shown in FIG. 8. The free end 112A is an inboard-most portion of the second corner seal member 74.

As shown in FIG. 10, an upper surface 112B and a lower surface 112C of the third lip 112 are both curved. As shown in FIG. 7, the cross section illustrated in FIG. 10 is taken spaced from a transition point 71 from the first seal member 66 to the second corner seal member 74. The third lip 112 transitions from curving downwardly (FIG. 8) proximate the transition point 71 to curving upwardly spaced from the transition point 71, as shown in FIG. 10. The second corner seal member 74 is similarly configured at the transition point 73 from the third seal member 70 to the second corner seal member 74. The third lip 112 of the second corner seal member 74 transitions from the upper and lower surfaces 112B and 112C curving downwardly (FIG. 8) at the transition points 71 and 73 to the first and third seal members 66 and 70 to the upper and lower surfaces 112B and 112C curving upwardly, as shown in FIG. 10, as the distance from the transition points 71 and 73 to the first and third seal members 66 and 70 increases. This configuration of the third lip 112 of the second corner seal member 74 substantially prevents visible gapping with the interior trim member connected to the second door frame 52 in the vicinity of the C-pillar structure 22 (FIG. 1). The transition of the third lip 112 from curving downwardly to curving upwardly and back to curving downwardly moving away from the transition point 71 with the first seal member 66 to the transition point 73 with the third seal member 70 facilitates preventing visible gapping with the interior trim member.

As shown in FIGS. 8-10, the corner seal member has a length L measured from a center of the inboard wall to the free end of the third lip. The length L increases as the distance from the transition points increases. In other words, the length L of the third lip increases as you approach a corner of the corner seal member. The increased length L of the third lip provides for the transition of the third lip from curving downwardly to curving upwardly, as shown in FIGS. 8-10, thereby facilitating preventing visible gapping in the corner of the hybrid seal member.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hybrid door seal. Accordingly, these terms, as utilized to describe the present invention should be interpreted relative to a vehicle equipped with the hybrid door seal.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid door seal for a vehicle comprising:
a first seal member, the first seal member being configured to be received by a channel in a door frame;
a second seal member, the second seal member being configured to be received by the channel in the door frame; and
a corner seal member connecting the first seal member and the second seal member,
a first lip extending outwardly from a wall of the corner seal member, the first lip being configured to engage an inboard side of the window,
a second lip extending inwardly from the wall of the corner seal member, the second lip being curved,
an inner surface of a free end of the second lip curving upwardly proximate a transition point between the corner seal member and each of the first and second seal members, and the inner surface of the free end of the second lip curving downwardly spaced from the transition point between the corner seal member and each of the first and second seal members, and
the first seal member, the second seal member and the corner seal member being integrally formed as a one-piece member.

2. The hybrid door seal according to claim 1, wherein the first and second seal members are formed by extrusion.

3. The hybrid door seal according to claim 1, wherein the corner seal member is formed by molding.

4. The hybrid door seal according to claim 1, wherein the channel includes a first channel and a second channel, the first channel being configured to receive the first seal member, the second channel being configured to receive the second seal member, the corner seal member being configured to be received by the first and second channels in the door frame.

5. The hybrid door seal according to claim 1, wherein a window is configured to be received by the first seal member, the second seal member and the corner seal member.

6. The hybrid door seal according to claim 1, wherein the second lip extends from a lower end of the wall of the corner seal member.

7. A hybrid door seal for a vehicle comprising:
a first seal member, the first seal member being configured to be received by a channel in a door frame;
a second seal member, the second seal member being configured to be received by the channel in the door frame; and
a corner seal member connecting the first seal member and the second seal member,
a first lip extending outwardly from a wall of the corner seal member, the first lip being configured to engage an inboard side of the window,
a second lip extending inwardly from the wall of the corner seal member, the second lip being curved,
the second lip having a first width proximate a transition point between the corner seal member and the first seal member, a second width proximate the transition point between the corner seal member and the second seal member, and a third width between the transition points, the third width being larger than each of the first and second widths, and
the first seal member, the second seal member and the corner seal member being integrally formed as a one-piece member.

8. A door assembly for a vehicle comprising:
a door frame including a first channel and a second channel, the first and second channels extending in different directions; and
a hybrid door seal disposed in the first and second channels, the hybrid door seal including
a first seal member disposed in the first channel of the door frame;
a second seal member disposed in the second channel of the door frame; and
a corner seal member connecting the first seal member and the second seal member,
a first lip extending outwardly from a wall of corner seal member, the first lip being configured to engage an inboard side of the window,
a second lip extending inwardly from the wall of the corner seal member, the second lip being curved,
an inner surface of the second lip curving upwardly proximate a transition point between the corner seal member and each of the first and second seal members,
the first seal member, the second seal member and the corner seal member being integrally formed as a one-piece member.

9. The door assembly according to claim 8, wherein a window is configured to be received by the first seal member, the second seal member, and the corner seal member.

10. The door assembly according to claim 8, wherein the corner seal member is received by the first channel and the second channel of the door frame.

11. The door assembly according to claim 8, wherein the second lip extends from a lower end of the wall of the corner seal member, and the second lip includes an upper curved surface and a lower curved surface.

12. The door assembly according to claim 8, wherein the inner surface of the second lip curves downwardly spaced from the transition point between the corner seal member and each of the first and second seal members.

13. The door assembly according to claim 8, wherein a free end of the second lip is spaced from a lowermost surface of a trim member attached to the door frame.

14. The door assembly according to claim 8, wherein the second lip has a first width proximate the transition point between the corner seal member and the first seal member, a second width proximate the transition point between the corner seal member and the second seal member, and a third width between the transition points, the third width being larger than each of the first and second widths.

* * * * *